(12) United States Patent
Agarwal et al.

(10) Patent No.: US 7,991,007 B2
(45) Date of Patent: Aug. 2, 2011

(54) METHOD AND APPARATUS FOR HARDWARE PACKETS REASSEMBLY IN CONSTRAINED NETWORKS

(75) Inventors: Puneet Agarwal, Cupertino, CA (US); Yook Khai Cheok, Palo Alto, CA (US)

(73) Assignee: Broadcom Corporation, Irvine, CA (US)

(*) Notice: Subject to any disclaimer, the term of this patent is extended or adjusted under 35 U.S.C. 154(b) by 1524 days.

(21) Appl. No.: 11/172,799

(22) Filed: Jul. 5, 2005

(65) Prior Publication Data

US 2006/0106946 A1   May 18, 2006

Related U.S. Application Data

(60) Provisional application No. 60/622,796, filed on Oct. 29, 2004, provisional application No. 60/668,967, filed on Apr. 7, 2005.

(51) Int. Cl.
*H04J 3/24* (2006.01)
(52) U.S. Cl. .......................... 370/474; 370/412; 370/230
(58) Field of Classification Search .................. 370/474, 370/394, 353, 392, 238, 395.1, 341, 400; 710/30
See application file for complete search history.

(56) References Cited

U.S. PATENT DOCUMENTS

| | | | |
|---|---|---|---|
| 5,008,878 A * | 4/1991 | Ahmadi et al. .............. 370/353 |
| 6,381,242 B1 * | 4/2002 | Maher et al. ................. 370/394 |
| 6,704,794 B1 * | 3/2004 | Kejriwal et al. ............. 709/236 |
| 6,779,050 B2 * | 8/2004 | Horton et al. .................. 710/30 |
| 6,781,992 B1 * | 8/2004 | Rana et al. .................... 370/394 |
| 7,089,486 B1 * | 8/2006 | Marleux et al. ............... 714/807 |
| 7,209,448 B2 * | 4/2007 | Oskouy et al. ................ 370/238 |
| 7,224,693 B1 * | 5/2007 | Zhou et al. ................. 370/395.1 |
| 7,237,036 B2 * | 6/2007 | Boucher et al. .............. 709/245 |
| 7,304,996 B1 * | 12/2007 | Swenson et al. .............. 370/394 |
| 7,385,984 B2 * | 6/2008 | Parker et al. .................. 370/392 |
| 7,400,613 B2 * | 7/2008 | Sala et al. ..................... 370/341 |
| 2002/0018475 A1 * | 2/2002 | Ofek et al. .................... 370/400 |
| 2003/0002505 A1 * | 1/2003 | Hoch et al. .................... 370/392 |
| 2004/0073703 A1 * | 4/2004 | Boucher et al. .............. 709/245 |
| 2006/0072578 A1 * | 4/2006 | Alfano .......................... 370/394 |
| 2009/0097490 A1 * | 4/2009 | Sanderson et al. ....... 370/395.53 |
| 2010/0174831 A9 * | 7/2010 | Elzur ............................ 709/250 |

\* cited by examiner

*Primary Examiner* — Derrick W Ferris
*Assistant Examiner* — Peter Cheng

(57) ABSTRACT

A hardware packets reassembly apparatus and method includes an ingress unit receiving and parsing a data packet, recognizing fragments corresponding to the data packet, and outputting control information of the fragments. An en-queue unit stores the control information of each fragment, links each related fragment based on the control information, and enqueues the data packet when all fragments are available corresponding to the data packet, wherein the data packet is enqueued only when all of the fragments corresponding to the data packet are available in a sequential order. A dequeue unit dequeues the data packet from a packet descriptor, and scheduling the data packet based on a corresponding class of service. An egress unit assembles all fragments corresponding to the data packet into a full packet and outputting the assembled data packet from an output port.

20 Claims, 3 Drawing Sheets

METHOD AND APPARATUS FOR HARDWARE PACKETS REASSEMBLY IN CONSTRAINED NETWORKS

REFERENCE TO RELATED APPLICATION

This application claims priority of U.S. Provisional Patent Application Ser. No. 60/622,796, filed Oct. 29, 2004, and U.S. Provisional Patent Application Ser. No. 60/668,967, filed Apr. 7, 2005. The subject matter of this earlier filed application is hereby incorporated by reference.

BACKGROUND OF THE INVENTION

1. Field of the Invention

The invention is related to a method and apparatus to enable hardware reassembly of fragmented IP data packets across traffic classes in a constrained network.

2. Description of the Related Art

In conventional systems, large IP packets are normally fragmented using software in a transmitting host when conveyed in a constrained network to a receiving counterpart. The receiving software then reassembles a packet upon receipt of all of the relevant fragments. In a conventional system, switches or routers hardware treat fragmented packets as individual packets. Packets are normally fragmented and reassembled by software running on the network's processors on the end systems. A method and apparatus are needed to perform fragmented reassembly function directly in the switches or routers hardware to increase an overall network performance and efficiency.

BRIEF DESCRIPTION OF THE DRAWINGS

Further aspects, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

In order to better describe the hardware packets reassembly apparatus and method, a switch or a router which will contain the invention has the following generic stages: ingress stage, en-queue stage, de-queue stage, and egress stage. The ingress stage is a stage where a packet is coming into a switch or a router. The ingress state contains packets parsing, look up, and forward decision logic. The en-queue stage is a stage containing logic which collects a packet's control information from the ingress stage and queues the packet into a packet buffer. The de-queue stage is a stage handling the de-queuing logic of the packet from the packet buffer. The de-queue stage also provides different Class of Service (COS) priority scheduling. The egress stage is a stage handling the packet de-queued from the packet buffer and transmitting packets out of a switch or a router. If necessary, a packet modification is made in the egress stage.

According to an embodiment of the present invention, the hardware packets reassembly apparatus and method support the following normal features in a switch system: assembly of various fragmented packet types including IP, wireless Lightweight Access Point Protocol (LWAPP) and other tunneled packets, a packet or packets fragments aging, unicast or multicast packets, different Class of Services (COS), and a Maximum Transmit Unit (MTU) check for packet reassembly decision.

The following constraints are assumed in a switching network: packets are fragmented in a finite small number, for instance, into two fragments, fragments of a packet are received in order, out of order fragments or interleaved fragments from a same source and same class will be dropped, and fragmented packets are supported by a finite number of source devices. It should be noted that although the reassembly is described hereon using two fragments, the apparatus and method, in accordance with an embodiment of the present invention, for reassembly of the two fragments can be extended to reassemble packets with more than two fragments where the fragment number can be determined from the packet header. The reassembly of the two fragments may be achieved by adding additional fields to a Packet Link RAM to store context for more than one fragment and linking the fragments.

Figure 1:
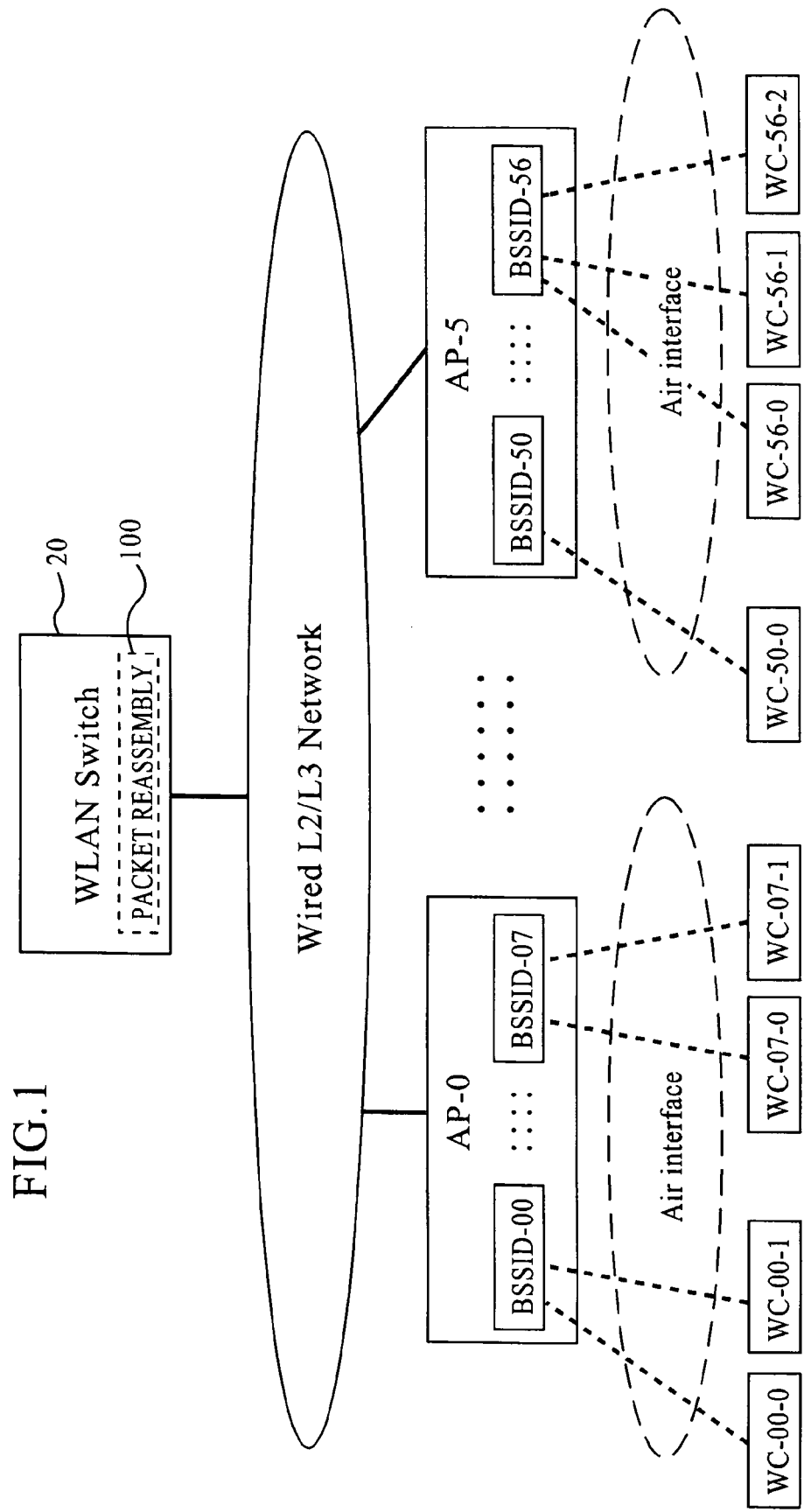
FIG. 1 illustrates a high-level architecture of switching environment incorporating a packet reassembly apparatus and process thereof, in accordance with an embodiment of the present invention.

FIG. 1 illustrates an example of a constrained network which contains both wired and wireless devices. The hardware packet reassembly apparatus resides in the WLAN switch 20. In this network, a wireless client, WC-00-0, may send packets to another wireless client, WC-50-0. The packets coming from the WC-00-0 client may be divided into a few fragments by an access point device, AP-0, after encapsulating some header information. All fragments of the packet will eventually route through the WLAN switch 20. When the WLAN switch 20 routes the packet received from WC-00-0, the packet reassembly apparatus 100 in the switch may collect all the fragments corresponding to the same packet, stripes off the header and reassemble the fragments into the packet. The entire packet is then sent through the network to the final destination of the WC-50-0 client in a full line rate speed.

Figure 2:
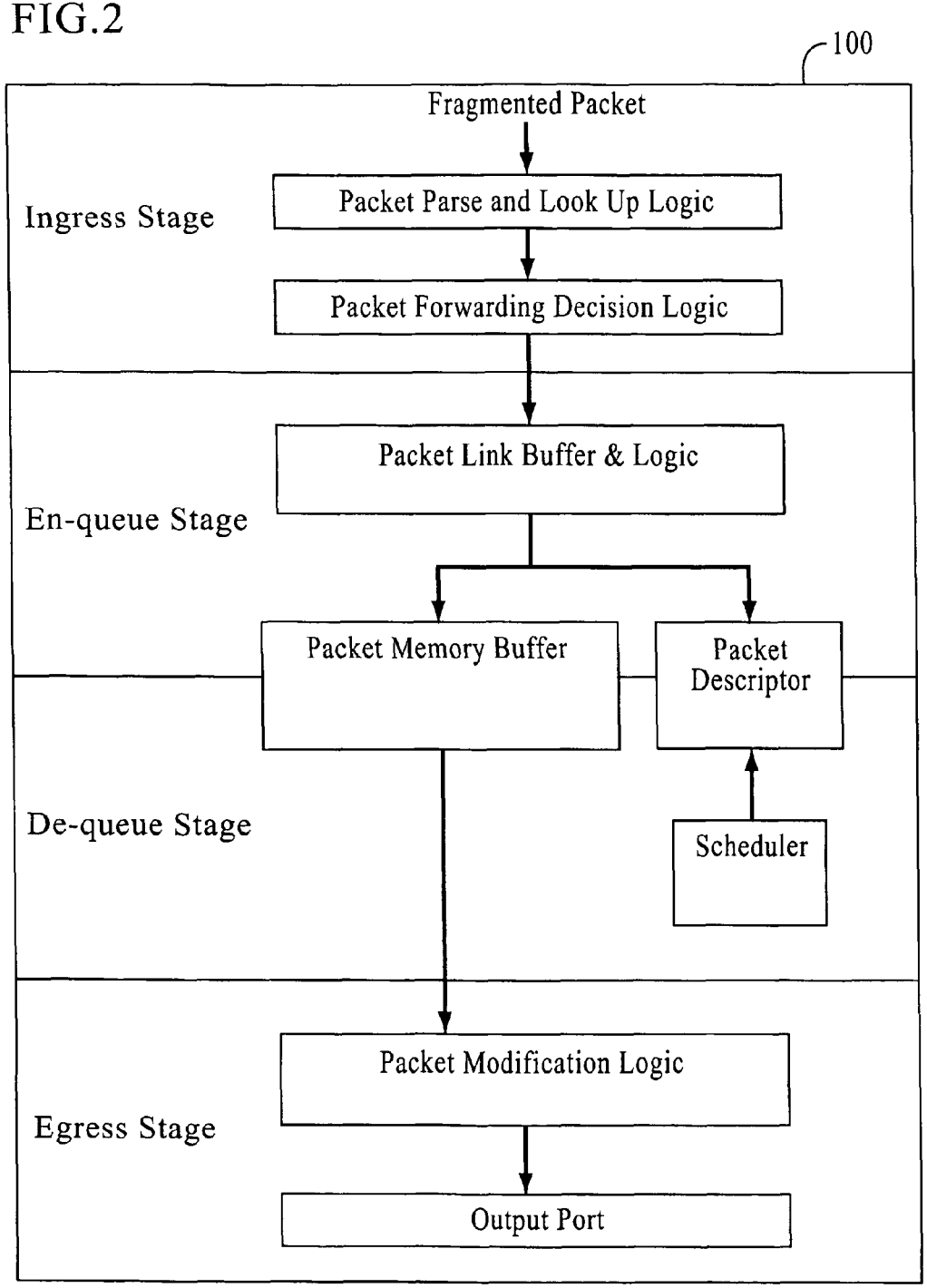
FIG. 2 illustrates the design flow of the packet reassembly apparatus in a switch device to reassemble fragmented data packets, in accordance with an embodiment of the present invention.

According to an embodiment of the present invention, as illustrated in FIG. 2, the packet reassembly apparatus 100 is provided to ensure that all of the corresponding fragments associated with a data packet are received and processed before the data packet can be output by the WLAN switch 20 to other segments of the constrained network. To reassemble a packet from its fragments, the hardware packets reassembly apparatus of the present invention includes the following four major functionalities are provided. In the first functionality, at an ingress stage, the hardware packets reassembly apparatus parses received packets, recognizes fragments, and outputs fragments' control information. In the second functionality, at the en-queue stage, the hardware packets reassembly apparatus stores each fragment's information and data, links each related fragments and en-queue packets into a memory buffer when all fragments are available. In the third functionality, at the de-queue stage, the hardware packets reassembly apparatus de-queues packets from the packet descriptor, schedules the packets to be read out from the memory buffer according to the corresponding class of service (COS). In the fourth functionality, at the egress stage, the hardware packets reassembly apparatus assembles all fragments of a packet from the de-queue stage into a full packet and sends it out to the output port.

The following sections provide detail descriptions of each functionality of the packets reassembly apparatus in each of the stages.

When the packet reassembly apparatus 100 receives a packet in the ingress stage, it will firstly parse the packet in order to know the type of packet. A packet can be one of various Ethernet packet types, such as Ethernet II. Inside the Ethernet packet can be an IP packet or another (potentially fragmented) Layer 2 frame (Ethernet II, 802.3, 802.11 etc.). Based on each type of packet, the parsing logic inside the ingress stage can extract the control information from the header of the packet. For a fragmented packet, the header may contain the following fields for reassembly: source and destination address, fragment payload size, fragment identity (Fragment ID), fragment payload offset, source and destination ports, if applicable, Class of Services (COS) of the packets, if applicable, and/or tunnel keys, if applicable.

Based on the control information above, the hardware packets reassembly apparatus can identify if an incoming packet is a fragmented packet. If it is a fragment of a packet, the apparatus can further detect, in a hardware platform, the sequence number of a fragment corresponding to a particular data packet with respect to other fragments, that is, whether the fragment is the first fragment or the second fragment based on the fragment ID and offset. These fragment fields, once parsed from the header, includes source and destination ports/address, fragment ID, and fragment sequence number.

Further in the ingress stage, the forwarding decision for the packet is determined. All control information related to the forwarding decision of the packet is passed along with the payload to the en-queue stage logic, which includes unicast or multicast, class of services, etc. Along with this information, if the packet is a fragment, the additional fragment fields will be provided to the en-queue logic as well.

In the en-queue stage, the hardware packets reassembly apparatus includes an important piece of hardware for fragmented packets reassembly purpose in front of a normal en-queuing packet descriptor. In accordance with an aspect of the present invention, the packet reassembly apparatus 100 will not en-queue any fragment of a packet until all fragments that form the entire data packet have become available in a sequential order. Instead, each fragment's control fields from the ingress stage is maintained and stored in the fragment link buffer before en-queuing into the packet descriptor, while the payload is still kept in the memory buffer.

The fragment link buffer hardware in this packet reassembly apparatus invention stores and links all fragments of a packet to be reassembled. All of the fragment fields available from the ingress stage are kept in this link buffer before en-queuing. In additional, this link buffer performs important checking including ordering of the fragments received, missing fragments, and aging of the fragments resided in the link buffer. Packets will be dropped here due to out-of-order fragments received, missing fragments, or fragments aged out based on user programmed time. Dropped packets will be counted in a stat counter (not shown).

Figure 3:
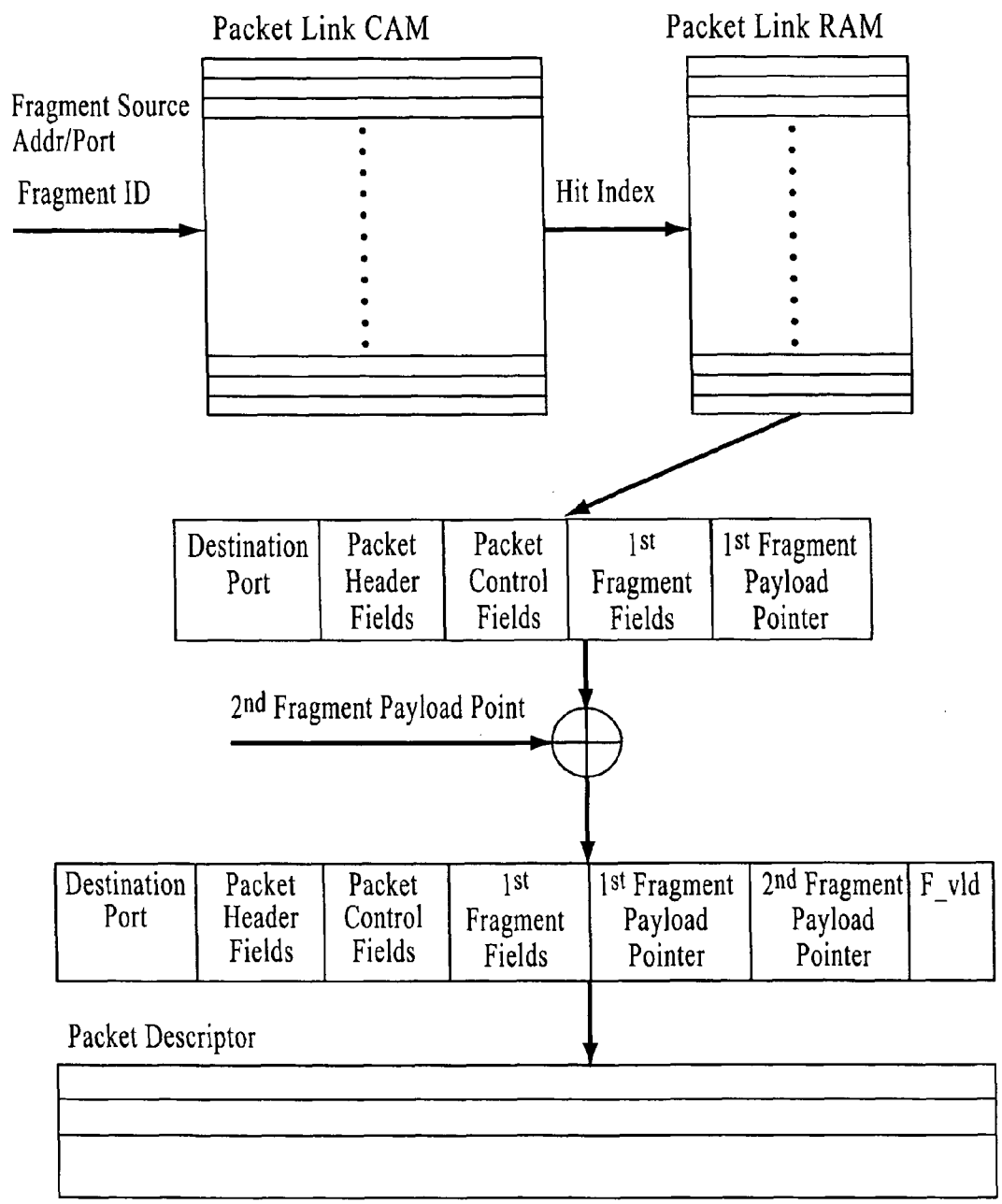
FIG. 3 illustrates details of a fragment link buffer, in accordance with an embodiment of the present invention.

FIG. 3 shows the packet link buffer of hardware packets reassembly apparatus per each COS. If eight COS are supported, eight packet link buffers are provided. In accordance with an embodiment of the present invention, there are two fragments per each packet. The packet link buffer comprises two pieces of relevant memory hardware with the same numbers of entries, a content addressable memory (CAM) that contents the source address or port and fragment ID as the compare keys as well as RAMs (one per each class) that store the forwarding control information and a memory buffer pointer which contains the payload.

The first part of the relevant hardware is a CAM hardware which compares an incoming fragmented packet's field versus what have been stored in the link buffer. Every time when a fragmented packet arrives from the ingress logic, according to the COS, the source address, the destination address, the incoming port and the fragment ID are used to compare with the existing content inside the link buffer CAM. If the comparison is a miss and the fragment offset is zero, i.e., it is the first fragment, and the link buffer is not full, a new entry insertion of a new fragment will occur. An empty entry is allocated to store the source port/address and the fragment ID. The valid bit of this entry will be turned on. The aging counter of this entry will also activate. The corresponding entry number is used to index into the link buffer data RAM. In parallel with this new entry insertion, the payload of this fragmented packet is stored into the memory buffer. However, it is not yet en-queued into the packet descriptor. The forwarding information as well as the payload memory pointer are stored in the link buffer entry. If the link buffer is full, the fragmented packet will be dropped and a drop counter will keep the statistic.

If the comparison is a miss and the fragment offset is non-zero, the fragment will be dropped and the drop counter will increment. The payload will not be stored in the memory buffer and there is also no update to the link buffer RAM, which means all valid entries inside the link buffer CAM and RAM are always the first fragment of a packet. Also, fragments received out of order will be dropped. This includes packet dropped by the aging mechanism, which will be discussed shortly.

If the comparison is a hit (the entry valid is also set) and the fragment offset is zero, that means that there is an older first fragment residing in the link buffer. The older fragment, therefore, retired from the link buffer and the corresponding payload will be invalidated by returning the memory pointer back to the memory buffer. The new fragment is inserted and stored.

If the comparison is a hit and the fragment offset is non-zero, this is a normal case of fragments received in order where the hardware based packet reassembly occurs. Similarly, the payload of the second fragment will be stored into the memory buffer. The CAM hit generates an index to get the first fragment's control fields data from the RAM. At this point, the fragment offset of the second fragment checks against the first fragment offset for consistency. If the offset is not consistent, both fragments are dropped. The packet link buffer entry and together with the memory buffer entries containing the payloads will be invalidated and freed up. Otherwise, these control fields, together will the second fragment's memory pointer are sent to en-queue into the packet descriptor, as will be described shortly. The entry inside the CAM and RAM of the link buffer will be invalidated upon the read operation for en-queuing.

The hardware packets reassembly apparatus provides a user programmed aging threshold value. As described above, whenever a new fragment is inserted into the link buffer, an aging counter is activated. The aging counter will increment until it reaches the threshold where the link buffer entry will be aged and invalidated and the counter resets itself for a next insertion of that entry. Therefore, any first fragment residing in the link buffer too long is aged out, thereby clearing unwanted entries inside the link buffer due to fragments received too long between the first and second fragments as well as the first fragment received after the second fragment of the packet.

The second part of the relevant hardware structure in the en-queue stage is the packet descriptor. Each entry of the packet descriptor contains all forwarding control information, the header information, and payload pointer of the packet that is ready to be transmitted to a output port (if unicast) or multi output ports (if multicast).

As shown in FIG. 3, when both fragments of the packet are available and their offsets are consistent, the packet link buffer logic links the two fragments' information together before en-queuing into the packet descriptor. The first fragment's control information read out of a packet link buffer entry contains the destination port(s), the forwarding control, the header information, and the first fragment's payload pointer in the memory buffer. This information is combined with the second fragment's payload pointer to form a full entry and queued into the packet descriptor in one single entry. Note that an f_vld bit set denotes an entry in the packet descriptor including two fragments components. If f_vld is clear, it means that the packet is not a fragmented packet and no reassembly is required later in the egress stage.

Once the packet is en-queued into a packet descriptor entry, it is ready to be transmitted to output port(s). The transmission of the packet depends on the scheduling logic in the de-queue stage and the output port(s) availability. Upon satisfaction of the de-queuing requirement, a scheduler in the de-queue stage will read out each valid entry in the packet descriptor and transmit to the output port one at a time. When the scheduler reads out an entry with the f_vld set, it realizes that the entry is a fragment entry with two fragment payloads located in different memory buffer locations as indicated by the two different memory pointers. The scheduler has to first arrange the header and the first fragment payload to be sent to the egress port. Immediately, it should schedule the second fragment's payload to the same egress port (regardless of even other higher priority packet that needs to egress that port). The fragments' order has to be sequential and also both fragments have to be sent back to back to avoid under-run condition from happening in the egress out-going port. This also obviates the need to temporarily store the first fragment after dequeue. Essentially the scheduling logic treats the two fragments as one scheduling entity even though the buffer management logic treats each fragment as a separate packet.

The egress stage is the final stage of the hardware packets reassembly apparatus. Again, the egress logic must receive the fragments in the right sequential order and intact. In this stage, there is a packet modification hardware which physically handles the assembly of two fragments into a full packet before sending out to the output port. The modification hardware will encapsulate the proper header, align two fragmented payloads together and later regenerate cyclic redundancy check (CRC) to form a full packet. Eventually, the incoming fragmented packets are reassembled into a full packet using the hardware packets reassembly apparatus and method. The final full packet will then be transmitted out to the output port of a switch. It is possible that the reassembled packet exceeds the relevant Maximum Transmission Unit (MTU) of the outgoing logical interface and hence the reassembled packet will then be fragmented into a new set of fragments before being sent out the output port.

The principles of the present invention may similarly be applied to an 802.11 family of wireless standards and use terminology taken from these standards. Further, the principles of the present invention may similarly be applied in wireless LANs of other types, based on other standards and communication protocols. Similarly, although these embodiments are built around Ethernet LANs, the principles of the present invention may likewise be applied using LANs of other types for communication between the access points and manager node. As previously indicated, a fragmented packet reassembly apparatus and process are provided to reassemble fragmented data packets by preventing reassembling of the data packet in an improper fragment order and preventing intervening fragments not corresponding to the same data packet. In addition, in view of the foregoing, a person of ordinary skill in the art will appreciate that the packet reassembly apparatus may be applied to a wired or wireless switching network.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A hardware packets reassembly apparatus, comprising:
an ingress unit configured to receive a plurality of fragments corresponding to a data packet, and configured to output forwarding control information associated with the plurality of fragments;
an en-queue unit configured to store the forwarding control information of each fragment from the plurality of fragments, and link related fragments from the plurality of fragments based on the forwarding control information, the en-queue unit configured to store a descriptor of the data packet in a packet descriptor buffer in response to all fragments from the data packet being received in a sequential order, the en-queue unit configured to drop out-of-order fragments that are received in an order different from the sequential order until all fragments from the data packet are received in the sequential order;
a de-queue unit configured to schedule transmission of the plurality of fragments as a single unit based on the stored descriptor and based on a class of service, and configured to retrieve each fragment from the plurality of fragments based on the stored descriptor of the data packet, the descriptor including a pointer for each fragment from the plurality of fragments and the forwarding control information; and
an egress unit configured to assemble the plurality of fragments corresponding to the data packet into a full data packet.

2. The hardware packets reassembly apparatus as recited in claim 1, wherein the forwarding control information comprises at least one of a source address and a destination address, a fragment payload size, a fragment identity, a fragment payload offset, a source port and a destination port, an indicator of a class of service of the data packet, and a tunnel key.

3. The hardware packets reassembly apparatus as recited in claim 1, wherein the ingress unit is configured to identify whether a fragment from the plurality of fragments is received at the ingress unit based on the forwarding control information.

4. The hardware packets reassembly apparatus as recited in claim 1, wherein the ingress unit is configured to detect, in a hardware platform, whether a fragment from the plurality of fragments is received in the sequential order with respect to other fragments from the plurality of fragments, based on a fragment identifier and an offset associated with the fragment from the plurality of fragments.

5. The hardware packets reassembly apparatus as recited in claim 1, wherein the ingress unit is configured to process the forwarding control information related to a forwarding decision for the data packet and the en-queue unit.

6. The hardware packets reassembly apparatus as recited in claim 1, wherein the en-queue unit further comprises a fragment link buffer, the en-queue unit and the de-queue unit share a packet memory buffer and a packet descriptor, each forwarding control information of each fragment from the plurality of fragments is stored in the fragment link buffer, while a payload of the data packet defined by at least a portion of the plurality of fragments is stored in the packet memory buffer.

7. The hardware packets reassembly apparatus as recited in claim 6, wherein the fragment link buffer is configured to determine whether the plurality of fragments are received in the sequential order, check for fragments missing from the plurality of fragments, and an age of each of the fragments from the plurality of fragments when the plurality of fragments are stored in the fragment link buffer.

8. The hardware packets reassembly apparatus as recited in claim 7, wherein the fragment link buffer comprises a link buffer content-addressable memory (CAM) and link buffer random-access memory (RAM), and the fragment link buffer is configured to compare a field of an incoming fragment from the plurality of fragments with existing content inside the link buffer CAM.

9. The hardware packets reassembly apparatus as recited in claim 8, wherein when the comparison is a miss, a fragment offset is zero, and the link buffer CAM is not full, the fragment link buffer is configured to create a new entry insertion of the incoming fragment, the new entry insertion includes the source port/address and fragment identifier of the data packet, a valid bit representing that the entry is valid, and an age counter value.

10. The hardware packets reassembly apparatus as recited in claim 8, wherein when the comparison is a miss, a fragment offset is non-zero, the incoming fragment is dropped, the payload corresponding with the incoming fragment is not stored, and the link buffer RAM is not updated.

11. The hardware packets reassembly apparatus as recited in claim 8, wherein when the comparison is a hit and a fragment offset is zero, the fragment link buffer sends an indicator representing that an older first fragment is stored in the link buffer CAM.

12. The hardware packets reassembly apparatus as recited in claim 8, wherein when the comparison is a hit and a fragment offset is non-zero, the incoming fragment is dropped, the payload corresponding with the incoming fragment is stored as an additional fragment, and the link buffer RAM is not updated.

13. The hardware packets reassembly apparatus as recited in claim 8, wherein when the comparison is a hit and the incoming fragment offset is non-zero, the plurality of fragments are determined to be received in the sequential order and configured to be reassembled.

14. The hardware packets reassembly apparatus as recited in claim 8, further comprising:
an aging counter counting a time period from when the incoming fragment is received to a threshold level where the link buffer entry corresponding to the incoming fragment is aged and invalidated and the aging counter resets itself for a next insertion of the link buffer entry.

15. The hardware packets reassembly apparatus as recited in claim 1, wherein the de-queue unit comprises a scheduler configured to select and schedule output of linked shim headers and the plurality of fragments to the egress unit.

16. The hardware packets reassembly apparatus as recited in claim 1, wherein the egress unit is configured to assemble the plurality of fragments by adding additional fields to a Packet Link RAM to store context for more than one of the plurality of fragments.

17. The hardware packets reassembly apparatus as recited in claim 1, wherein the en-queue unit includes a plurality of fragment link buffers, each fragment link buffer from the plurality of fragment link buffers is associated with a different class of service.

18. The hardware packets reassembly apparatus as recited in claim 1, wherein the descriptor includes a packet header field, a packet control field, a fragment field, and a destination port field, at least a portion of the descriptor is defined based on the forwarding control information.

19. A hardware packets reassembly method, comprising:
receiving a plurality of fragments corresponding to a data packet, and outputting forwarding control information associated with the plurality of fragments;
storing the forwarding control information of each fragment from the plurality of fragments;
linking related fragments from the plurality of fragments based on the forwarding control information;
storing a descriptor of the data packet in a packet descriptor buffer in response to all fragments from the data packet being received in a sequential order;
dropping out-of-order fragments received in an order different from the sequential order until all fragments from the data packet are received in the sequential order;
scheduling transmission of the plurality of fragments as a single unit based on the stored descriptor and based on a class of service;
retrieving each of the plurality of fragments based on the stored descriptor of the data packet, the descriptor including a pointer for each fragment from the plurality of fragments and the forwarding control information; and
assembling the plurality of fragments corresponding to the data packet into a full packet.

20. A hardware packets reassembly apparatus, comprising:
means for receiving a plurality of fragments corresponding to a data packet, and outputting forwarding control information associated with the plurality of fragments;
means for storing the forwarding control information of each fragment from the plurality of fragments, linking related fragments from the plurality of fragments based on the forwarding control information, for storing a descriptor of the data packet in a packet descriptor buffer in response to all fragments from the data packet, being received in a sequential order, and for dropping out-of-order fragments received in an order different from the sequential order until all fragments from the data packet are received in the sequential order;
means for scheduling transmission of the plurality of fragments as a single unit based on the stored descriptor and based on a class of service, and for retrieving each of the plurality of fragments based on the stored descriptor of the data packet, the descriptor including a pointer for each fragment from the plurality of fragments and the forwarding control information; and
means for assembling the plurality of fragments corresponding to the data packet into a full packet.

* * * * *

UNITED STATES PATENT AND TRADEMARK OFFICE
CERTIFICATE OF CORRECTION

PATENT NO.           : 7,991,007 B2
APPLICATION NO.      : 11/172799
DATED                : August 2, 2011
INVENTOR(S)          : Puneet Agarwal et al.

It is certified that error appears in the above-identified patent and that said Letters Patent is hereby corrected as shown below:

On title page, item (75), in "Inventors", in column 1, line 2, delete "Yook Khai" and insert -- Yook-Khai --, therefor.

Signed and Sealed this
Fourth Day of October, 2011

David J. Kappos
*Director of the United States Patent and Trademark Office*